(12) United States Patent
Zhao

(10) Patent No.: US 9,500,918 B2
(45) Date of Patent: Nov. 22, 2016

(54) DISPLAY SUBSTRATE AND DISPLAY DEVICE HAVING A DECREASED DRIVING VOLTAGE

(71) Applicant: BOE TECHNOLOGY GROUP CO., LTD., Beijing (CN)

(72) Inventor: Weili Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 51 days.

(21) Appl. No.: 14/422,209

(22) PCT Filed: Jul. 30, 2014

(86) PCT No.: PCT/CN2014/083307
§ 371 (c)(1),
(2) Date: Feb. 18, 2015

(87) PCT Pub. No.: WO2015/103870
PCT Pub. Date: Jul. 16, 2015

(65) Prior Publication Data
US 2016/0026025 A1    Jan. 28, 2016

(30) Foreign Application Priority Data

Jan. 13, 2014 (CN) .......................... 2014 1 0014787

(51) Int. Cl.
*G02F 1/1343* (2006.01)
*G02F 1/1333* (2006.01)
(Continued)

(52) U.S. Cl.
CPC ....... *G02F 1/13439* (2013.01); *G02F 1/13394* (2013.01); *G02F 1/133528* (2013.01);
(Continued)

(58) Field of Classification Search
CPC .................. G02F 1/134363; G02F 1/133707; G02F 1/136213; G02F 1/134366; G02F 1/1392; G02F 2001/134372; G02F 1/136286; G02F 1/133528; G02F 1/133526; G02F 1/1333; G02F 1/133305; G02F 1/133351; G02B 5/3033

USPC .................................. 349/141, 146, 96, 158
See application file for complete search history.

(56) References Cited

U.S. PATENT DOCUMENTS

2004/0196425 A1    10/2004   Hsieh et al.
2009/0219478 A1*   9/2009    Park .................... G02F 1/13731
                                                              349/155
(Continued)

FOREIGN PATENT DOCUMENTS

CN    1627162 A    6/2005
CN    102253540 A    11/2011
(Continued)

OTHER PUBLICATIONS

1st office action issued in Chinese application No. 201410014787.7 dated Oct. 9, 2015.
(Continued)

*Primary Examiner* — Mike Qi
(74) *Attorney, Agent, or Firm* — Nath, Goldberg & Meyer; Joshua B. Goldberg

(57) ABSTRACT

The invention provides a display substrate and a display device, and can solve the problems that, in the existing display technology, the driving voltage required for driving the blue-phase liquid crystal is higher, and there is large difficulty for manufacturing the wall-like electrodes and poor feasibility of process if the wall-like electrodes are used for driving. A display substrate of the invention comprises a base, and a first electrode and a second electrode arranged on the base, the first electrode having a closed ring shape, the second electrode being arranged in the ring shape of the first electrode, and a height of the second electrode being larger than that of the first electrode. A display device of the invention comprises the above display substrate, a first substrate opposite to the display substrate, and a blue-phase liquid crystal layer between the first substrate and the display substrate.

20 Claims, 4 Drawing Sheets

(51) Int. Cl.
G02F 1/1335 (2006.01)
G02F 1/1339 (2006.01)
G02F 1/137 (2006.01)

(52) U.S. Cl.
CPC ... *G02F1/134309* (2013.01); *G02F 1/134363* (2013.01); *G02F 2001/13793* (2013.01); *G02F 2001/133541* (2013.01)

(56) References Cited

U.S. PATENT DOCUMENTS

| | | | | |
|---|---|---|---|---|
| 2010/0079700 A1* | 4/2010 | Hasegawa | G02F 1/133528 | 349/62 |
| 2012/0257156 A1* | 10/2012 | Hiratsuka | G02F 1/134363 | 349/143 |
| 2014/0028958 A1* | 1/2014 | Lin | G02F 1/134363 | 349/98 |

FOREIGN PATENT DOCUMENTS

| | | |
|---|---|---|
| CN | 102368126 A | 3/2012 |
| CN | 102650778 A | 8/2012 |
| CN | 102736329 A | 10/2012 |
| CN | 102937760 A | 2/2013 |
| CN | 103728796 A | 4/2014 |
| JP | 2005-316000 A | 11/2005 |
| KR | 10-0293431 B1 | 4/2001 |
| WO | 01/33292 A1 | 5/2001 |

OTHER PUBLICATIONS

English translation of Written Opinion of PCT/CN2014/083307 from ISR dated Oct. 29, 2014 that was originally provided to the USPTO on Feb. 18, 2015 with the application.
International Patent Application No. PCT/CN2014/083307, International Search Report dated Oct. 29, 2014, fourteen (14) pages.

* cited by examiner

DISPLAY SUBSTRATE AND DISPLAY DEVICE HAVING A DECREASED DRIVING VOLTAGE

This is a National Phase Application filed under 35 U.S.C. 371 as a national stage of PCT/CN2014/083307, filed Jul. 30, 2014, and claims priority benefit from Chinese Application No. 201410014787.7, filed Jan. 13, 2014, the content of each of which is hereby incorporated by reference in its entirety.

FIELD OF THE INVENTION

The present invention relates to the field of display technology, and particularly to a display substrate and a display device.

BACKGROUND OF THE INVENTION

Liquid crystal display device is widely used for its perfect characteristics. Its working principle is as follows. Liquid crystal molecules are placed between two substrates, and different electrical fields are applied at different locations of the substrates so that the liquid crystal molecules are rotated differently so as to control light from backlight to deflect in different manners, which leads to different luminance of the emitted light, and thus image display is achieved.

Liquid crystal molecule as a display material is closely related to display quality of the liquid crystal display device. Blue phase (BP) is a phase state of liquid crystal having special properties, within a narrow temperature range (about 0.5 to 2 centigrade) between cholesteric phase and isotropic phase, and the phase state is stable. Because liquid crystal in this phase state usually appears blue, this phase state of liquid crystal is called blue phase. Blue-phase liquid crystal, as a promising liquid crystal display material, has the following advantages: (1) quick response speed (less than 1 ms), which makes field sequential color display possible; (2) capable of implementing display by directly using electric-field-induced birefringence principle (i.e., Kerr effect) without using a alignment layer; (3) good isotropy of liquid crystal when powered off, no light leakage in dark state, and good visual angle.

In a display device of the prior art, blue-phase liquid crystal is usually driven by transverse electric field. In this case, common electrodes and pixel electrodes are typically arranged in two manners. In the first arrangement manner, as shown in FIG. 1, common electrodes 3 and pixel electrodes 4 are only arranged on a lower substrate 101. In the second arrangement manner, as shown in FIG. 2, in a case that the common electrodes 3 and the pixel electrodes 4 are arranged on the lower substrate 101, the common electrodes 3 and the pixel electrodes 4 are also arranged on an upper substrate 102, and positions of the same type of electrodes on the two substrates are opposite to each other. In the above two manners for arranging the electrodes, the common electrodes 3 and the pixel electrodes 4 each are of bar shape, their numbers are more than one respectively, and they are arranged alternately and in parallel with each other. Electric field intensity of the transverse electric field for driving liquid crystal generated by the two types of electrodes as arranged in either of the above two manners is relatively weak, thus only liquid crystal molecules which are located near the pixel electrodes 4 and the common electrodes 3 in a same plane are driven to stretch to exhibit anisotropy, while it is difficult to obtain a relative uniform horizontal electric field in a large thickness range of liquid crystal cell. Thus, higher driving voltage is necessary.

In the prior art, there is also disclosed a display device in which blue-phase liquid crystal is driven by using wall-like electrodes to generate transverse electric field. As shown in FIGS. 3 and 4, wall-like electrodes are arranged on the upper substrate 102 and the lower substrate 101, comprises the common electrodes 3 and the pixel electrodes 4, and has surfaces with wrinkles. Height of a wall-like electrode is larger than that of a normal electrode, which can achieve a relative uniform horizontal electric field in the large range of thickness of liquid crystal cell. In addition, the wrinkles can further enhance the electric field intensity, which decreases required driving voltage for blue-phase liquid crystal.

The inventor has found that at least following problems exist in the prior art: for the current driving manners for blue-phase liquid crystal, on one hand, higher driving voltage is needed when using a manner of normal transverse electric field; on the other hand, when using the wall-like electrodes to drive, since the wall-like electrodes have complex shapes, it is difficult to manufacture, and feasibility of process is poor.

SUMMARY OF THE INVENTION

The technical problems to be solved by the present invention includes: in the existing display technology, the driving voltage required for driving the blue-phase liquid crystal is higher, and there is large difficulty for manufacturing the wall-like electrodes and poor feasibility of process if the wall-like electrodes are used for driving. In view of the above problems, the present invention provides a display substrate and a display device, which can decrease the driving voltage for blue-phase liquid crystal, and simpler fabricating process is required.

A technical solution used for solving the above technical problems is a display substrate comprising a base, and at least one first electrode and at least one second electrode arranged on the base, wherein, the first electrode has a closed ring shape in a top view, the second electrode is arranged within the ring shape of the first electrode, and a height of the second electrode is larger than that of the first electrode.

Preferably, the closed ring shape is circular shape, oval shape, or rectangular shape.

Preferably, number of the second electrode disposed within the ring shape of each first electrode is 1.

Preferably, a central axis in a direction of the height of the second electrode is vertical to the base, and is located at the center of the ring shape.

Preferably, the second electrode has a pillar shape.

Preferably, the first electrode is a common electrode, and the second electrode is a pixel electrode; or the first electrode is a pixel electrode, and the second electrode is a common electrode.

When powered on, the first electrode and the second electrode of the display substrate of the present invention can generate a transverse electric field with larger electrical field intensity and larger range, and thus lower driving voltage is needed for driving liquid crystal in the display substrate of the invention. In addition, the electrodes in the present invention have simple structure and good feasibility of process.

A technical solution for solving the above technical problems is a display device comprising a first substrate and a blue-phase liquid crystal layer, and further comprising the above display substrate, the first substrate being arranged opposite to the display substrate, and the blue-phase liquid crystal layer being arranged between the first substrate and the display substrate.

Preferably, a third electrode is arranged on a side of the first substrate near the display substrate, the third electrode is arranged opposite to the first electrode, and both the third electrode and the first electrode are pixel electrodes or common electrodes.

Preferably, the height of the second electrode is less than or equal to vertical distance between the first substrate and the display substrate.

Preferably, the display device further comprises a first circular polarizer arranged on a side of the first substrate away from the display substrate; and a second circular polarizer arranged on a side of the display substrate away from the first substrate.

Since the display device of the present invention comprises the above display substrate, display quality of the display device is further improved, fabricating procedure is simplified, and fabricating cost is further decreased.

DETAILED DESCRIPTION OF THE EMBODIMENTS

In order that a person skilled in the art may fully understand the technical solutions of the invention, the invention will be described below in detail in conjunction with the accompanying drawings as well as specific embodiments.

Figure 1:
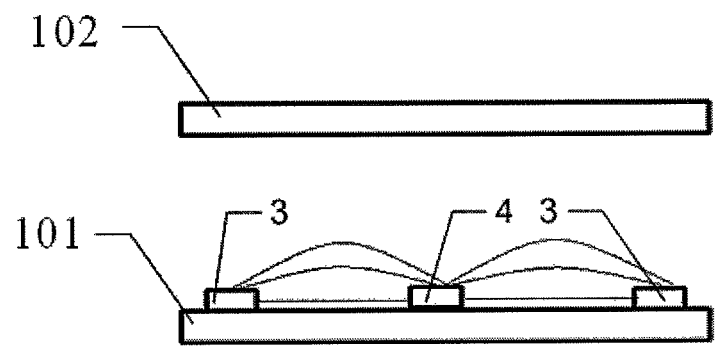
FIG. 1 is a schematic diagram of structure of a display device in the prior art in which blue-phase liquid crystal is driven by transverse electric field.
Figure 2:
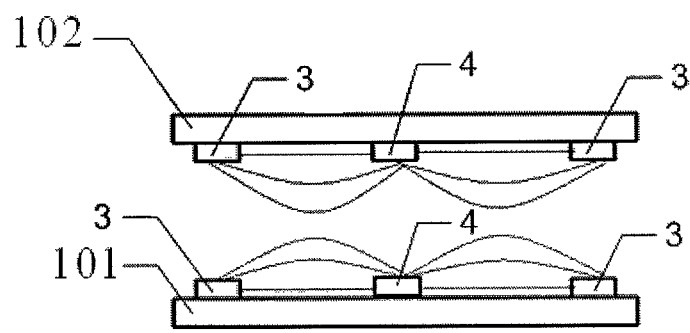
FIG. 2 is a schematic diagram of structure of another display device in the prior art in which blue-phase liquid crystal is driven by transverse electric field.
Figure 3:
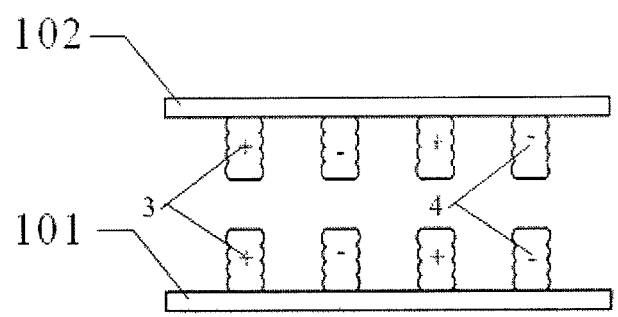
FIG. 3 is a schematic diagram of structure of a display device in the prior art in which blue-phase liquid crystal is driven by transverse electric field generated by wall-like electrodes.
Figure 4:
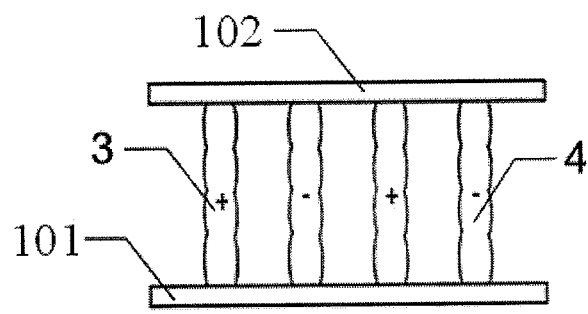
FIG. 4 is a schematic diagram of structure of another display device in the prior art in which blue-phase liquid crystal is driven by transverse electric field generated by wall-like electrodes.
Figure 5:
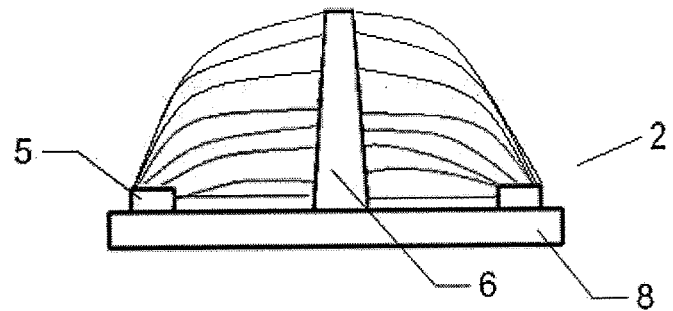
FIG. 5 is a schematic diagram of structure of a display substrate according to an embodiment of the present invention.
Figure 6:
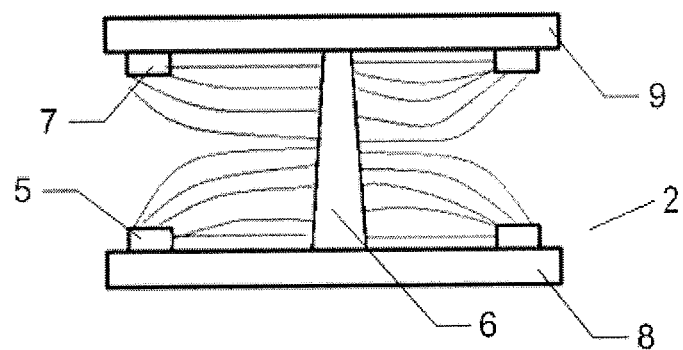
FIG. 6 is a schematic diagram of structure of a display device according to the embodiment of the present invention.
Figure 7:
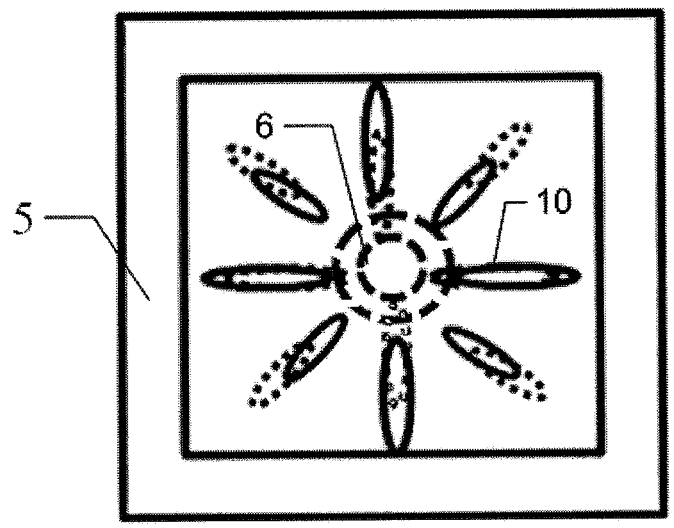
FIG. 7 is a schematic top view of electrodes in the display device according to the embodiment of the present invention and deflection of liquid crystal under the influence of an electric field.

As shown in FIGS. 5 and 7, a display substrate according to an embodiment of the present invention comprises a base 8, and a first electrode 5 and a second electrode 6 arranged on the base 8. Although only one first electrode 5 and one second electrode 6 are illustrated on the base 8 in FIGS. 5 to 7, it can be understood that it is a schematic example for convenience. In other embodiments, a plurality of first electrodes and second electrodes can be provided on the base of the display substrate. In the top view, the first electrode 5 has a closed ring shape (see FIG. 7), and in a stereogram, the first electrode 5 has a shape of a hollow pillar with small height. The second electrode 6 is arranged within the ring shape of the first electrode 5, i.e., is surrounded by the hollow pillar. Height of the second electrode 6 is larger than that of the first electrode 5. The heights of the first electrode 5 and the second electrode 6 determine distribution of electric field when electric power is supplied. In practical applications, the heights of the electrodes may be adjusted according to specific situations to generate required electric field. It can be understood that, "height" of an electrode as mentioned here means the length of the electrode in a direction vertical to a plane in which the base 8 is located, i.e., the length of the electrode in thickness direction of a liquid crystal cell after the liquid crystal cell is formed using the display substrate 2.

Compared with the prior art, transverse electric field generated by the first electrode 5 and the second electrode 6 of the display substrate of the present invention when electric power is supplied thereto has stronger intensity and larger range, so that lower driving voltage is required by the display device of the present invention for driving liquid crystal. In addition, the electrodes in the display substrate of the present invention have simple electrode structure and good feasibility of process.

Preferably, the closed ring shape of the first electrode 5 is rectangular shape. In the embodiment shown in FIG. 7, the shape of the first electrode 5 is illustrated as a square; however, the shape of the first electrode 5 is not limited to this. The planar shape of the first electrode 5 may be any suitable shape, for example, a circle. In the present invention, the ring shape means a pattern with closed circumference. Such ring shape may be above-mentioned circle, oval, rectangle or square. In addition, outer profile and inner profile of the first electrode 5 in the top view are preferably two concentric pattern with same shapes but different sizes, such as two squares having different side lengths or two circles having different radiuses, so as to generate an electric field with good symmetry; however, the outer profile and the inner profile may be different patterns, or there may be slight deviation between their centers.

Further preferably, central axis of the second electrode 6 in the height direction is vertical to the base, and located at the center of the ring shape of the first electrode 5, that is, the second electrode 6 is arranged at intersection point of the two diagonals of the small square shown in FIG. 7. In this way, when electric power is supplied, the electric field generated by the quadrate first electrode 5 and the pillared second electrode 6 has a centrally symmetrical distribution with the pillared second electrode 6 as a center.

Preferably, the second electrode 6 has a pillar shape. It can be understood that, the shape of the second electrode 6 may be considered as a pillar as long as the height of the second electrode 6 is larger than the distance between two most remote points on its cross sections. Shape of a cross section of the second electrode may be circle, rectangle, or hexagon or other shape, but preferably circle.

Next, fabricating process of the second electrode 6 will be described by an example in which the cross section of the second electrode 6 is a circle. Material of the second electrode 6 is Indium Tin Oxide (ITO), metal, or photoresist. When the second electrode 6 is made of photoresist material, at first, a cylindrical structure is formed by photolithography process, and then conductive material is applied on circumference surface of the cylindrical structure to form the second electrode 6. During the photolithography process, different amounts of exposure at two ends of the cylindrical structure may bring a result that one end of the second electrode 6 is thinner while the other end is thicker. When the second electrode 6 is made of Indium Tin Oxide (ITO) or metal, the case that one end of the second electrode 6 is thinner while the other end is thicker may also occur due to process reasons. Obviously, if the two ends of the second electrode 6 have the same thickness as the process is improved, the electric field generated when electric power is supplied may be more symmetric.

Preferably, one second electrode 6 is arranged in each first electrode 5. The electric field generated by one first electrode 5 and one second electrode 6 when electric power is supplied is symmetrically distributed with the second electrode 6 as the center and is uniform. However, the object of the invention may also be achieved in a case that two or more (e.g., two) second electrodes 6 are arranged within the ring shape of each first electrode 5, though display quality of the display device may be degraded to some degree.

Preferably, the first electrode 5 is a common electrode, and the second electrode 6 is a pixel electrode; or the first electrode 5 is a pixel electrode, and the second electrode 6 is a common electrode. That is, the object of the invention may also be achieved even when the electrode types of the first electrode 5 and the second electrode 6 are interchanged.

As shown in FIGS. 6 to 9, a display device according to an embodiment of the present invention comprises the display substrate 2 according to the embodiment of the present invention, a first substrate 9 opposite to the display substrate 2, and a blue-phase liquid crystal layer arranged between the first substrate 9 and the display substrate 2.

Preferably, a third electrode 7 is arranged on a side of the first substrate 9 near the display substrate 2, opposite to the first electrode 5, and has the same type as the first electrode 5.

That is to say, a third electrode 7 which has the same pattern as the first electrode 5 is formed on the first substrate 9, and is the same type as the first electrode 5 (for example, they are both pixel electrode, or both common electrode). In this way, an electric field may also be generated between the third electrode 7 and the second electrode 6, and thus driving effect is improved.

Preferably, height of the second electrode 6 is less than or equal to a vertical distance between the first substrate 9 and the display substrate 2. However, it is most preferably that the height of the second electrode 6 is equal to the vertical distance between the first substrate 9 and the display substrate 2.

That is to say, when the second electrode 6 "reaches to" the surface of the first substrate 6, as shown in FIG. 6, an electric field generated by the first electrode 5, the second electrode 6 and the third electrode 7 when electric power is supplied may be more uniform.

Preferably, the display device of this embodiment further comprises:

a first circular polarizer arranged on a side of the first substrate 9 away from the display substrate 2; and a second circular polarizer arranged on a side of the display substrate 2 away from the first substrate 9.

The circular polarizer is an optical element consists of a linear polarizer and a quarter-wave retardation plate. It transforms incident natural light into circularly polarized light which travels along optical axis and changes its direction spirally. In addition, the circular polarizer has characteristics of high thermal resistance, reusability, and long life.

Figure 8:
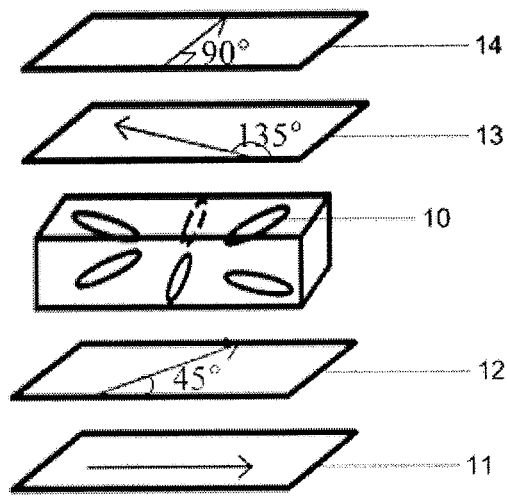
FIG. 8 is a schematic diagram of optical path of the display device according to the embodiment of the present invention.

Specifically, as shown in FIG. 8, the first circular polarizer consists of a first linear polarizer 11 and a first quarter-wave retardation plate 12, and the second circular polarizer consists of a second linear polarizer 13 and a second quarter-wave retardation plate 14. Optical path of incident light passing through the first circular polarizer and the second circular polarizer is as follows. The incident light becomes 0° linear polarized light after passing through the first linear polarizer 11 (e.g., polarized direction is 0°, i.e., is in the horizontal direction). The linear polarized light becomes right polarized light after passing through the first quarter-wave retardation plate 12 which is arranged at an angle of 45° with respect to the polarizing direction of the first linear polarizer 11.

If electric power is not supplied, the blue-phase liquid crystal molecules 10 are isotropic, thus polarization state of the right polarized light will not be changed when the right polarized light passes through the blue-phase liquid crystal layer, and then will become 0° linear polarized light when it passes through the second quarter-wave retardation plate which is arranged at an angle of 135° with respect to the polarizing direction of the first linear polarizer 11. This 0° linear polarized light is blocked by the second linear polarizer 13 which is arranged at an angle of 90° with respect to the polarizing direction of the first linear polarizer 11. Thus the display device is in a dark state.

As shown in FIG. 7, when electric power is supplied, the blue-phase liquid crystal molecules 10 are stretched due to its anisotropy appearing under the influence of an electric field. Because the electric field is symmetrically distributed with the second electrode 6 as a center, the blue-phase liquid crystal molecules 10 are distributed as a flower, so that the blue-phase liquid crystal molecules in various azimuth angles has a same optical delay. Value of the optical delay is a product of $\Delta n$ and thickness d of the liquid crystal cell, i.e., $\Delta nd$. According to Kerr effect, $\Delta n=\lambda KE^2$, wherein $\lambda$ is wavelength of incident light, K is Kerr constant, and E is electric field intensity at corresponding position. When $\Delta nd=\lambda/2$, the above right polarized light becomes left polarized light, and then becomes 90° linear polarized light after passing through the second quarter-wave retardation plate which is arranged at an angle of 135° with respect to the polarizing direction of the first linear polarizer 11. This 90° linear polarized light can pass through the second linear polarizer which is arranged at an angle of 90° with respect to the polarizing direction of the first linear polarizer 11. Thus the display device is in bright state.

Figure 9:
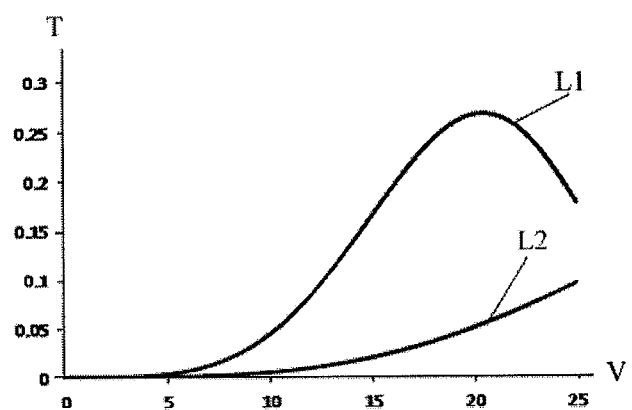
FIG. 9 is a schematic comparison diagram of V-T curves obtained by driving blue-phase liquid crystal using electrodes in an IPS mode of the prior art and electrodes in the display device according to the embodiment of the present invention respectively.

FIG. 9 is a schematic comparison diagram of V-T curves obtained by driving blue-phase liquid crystal using electrodes in an IPS (In Plane Switching) mode of the prior art and the electrodes in the display device according to the embodiment of the present invention respectively, in which V is indicative of scan voltage, and T is indicative of optical transmittance. This graph is obtained by simulation using TECHWIZ software.

It is assumed that wavelength of the incident light $\lambda=550$ nm, maximum birefringence is 0.2, Kerr coefficient $K=12.6$ nm/V^2 (V is indicative of voltage), the thickness of the liquid crystal cell is 10 μm, and voltage on the common electrode Vcom=0. In addition, voltage on the pixel electrode Vpix is set as the scan voltage, and, in a range of 0 to 25 V, is increased by 0.5V every 1 second from 0V until it reaches to 25V.

Referring to FIG. 9, in a case that the blue-phase liquid crystal is driven by the electrodes in the embodiment of the invention, V-T curve obtained is L1. According to the curve L1, when the scan voltage is 20V, the value of the optical transmittance arrives at its saturation value. In a case that the blue-phase liquid crystal is driven by the electrodes in IPS mode in the prior art, V-T curve obtained is L2. According to the curve L2, even when the scan voltage is 25V, the value of the optical transmittance does not arrive at its saturation value, and is far below the value of the optical transmittance in the case that the blue-phase liquid crystal is driven by the electrodes in the embodiment of the invention using the same voltage.

The display device of the embodiment of the present invention comprises the above display substrate 2, wherein, when incident light passes through the circular polarizer, all the anisotropic blue-phase liquid crystal molecules 10 contributes to changes of polarization state of the incident light. Thus, utilization ratio of the liquid crystal is high, driving voltage is reduced, and display quality of the display device is further improved; in addition, fabricating process is simplified, and fabricating cost of the display device is reduced.

It should be noted that, in the display device of the present embodiment, the first electrode 5 and the second electrode 6 are both arranged on the display substrate. Obviously, the first electrode 5 may be arranged on a side of the display substrate 2 near the first substrate 9, while the second electrode 6 may be arranged on a side of the first substrate 9 near the display substrate 2. Such arrangement can also achieve the object of the invention, and details will not be described here.

The display device of the present invention may be any product or component having display function, such as liquid crystal display device, mobile telephone, tablet computer, television, notebook PC, digital album, navigator, and so on.

It can be understood that the above embodiments are only exemplary embodiments for illustrating the principle of the present invention; however, the present invention is not limited thereto. As for a person skilled in the art, various variations and improvements can be made without departing from the spirit and essence of the present invention, and these variations and improvements should be considered to be fallen within the protection scope of the present invention.

The invention claimed is:

1. A display substrate, comprising a base, and at least one first electrode and at least one second electrode arranged on the base, wherein the first electrode has a closed ring shape in a top view, the second electrode is arranged within the ring shape of the first electrode, and a height of the second electrode is larger than that of the first electrode, wherein the first electrode is a planar electrode.

2. The display substrate of claim 1, wherein the closed ring shape is a circular shape, an oval shape, or a rectangular shape.

3. The display substrate of claim 2, wherein the second electrode has a pillar shape.

4. The display substrate of claim 1, wherein the number of the second electrode disposed within the ring shape of each first electrode is 1.

5. The display substrate of claim 4, wherein a central axis in a direction of the height of the second electrode is vertical to the base, and is located at the center of the ring shape.

6. The display substrate of claim 5, wherein the second electrode has a pillar shape.

7. The display substrate of claim 4, wherein the second electrode has a pillar shape.

8. The display substrate of claim 1, wherein the second electrode has a pillar shape.

9. The display substrate of claim 1, wherein
the first electrode is a common electrode, and the second electrode is a pixel electrode; or
the first electrode is a pixel electrode, and the second electrode is a common electrode.

10. A display device, comprising a first substrate and a blue-phase liquid crystal layer, wherein the display device further comprises the display substrate of claim 1, the first substrate being arranged opposite to the display substrate, and the blue-phase liquid crystal layer being arranged between the first substrate and the display substrate.

11. The display device of claim 10, wherein the closed ring shape is a circular shape, an oval shape, or a rectangular shape.

12. The display device of claim 11, wherein the second electrode has a pillar shape.

13. The display device of claim 10, wherein the number of the second electrode disposed within the ring shape of each first electrode is 1.

14. The display device of claim 13, wherein a central axis in a direction of the height of the second electrode is vertical to the base, and is located at the center of the ring shape.

15. The display device of claim 13, wherein the second electrode has a pillar shape.

16. The display device of claim 10, wherein the second electrode has a pillar shape.

17. The display device of claim 10, wherein
the first electrode is a common electrode, and the second electrode is a pixel electrode; or
the first electrode is a pixel electrode, and the second electrode is a common electrode.

18. The display device of claim 10, wherein a third electrode is arranged on a side of the first substrate near the display substrate, the third electrode being opposite to the first electrode, and both the third electrode and the first electrode are pixel electrodes or common electrodes.

19. The display device of claim 18, wherein the height of the second electrode is less than or equal to vertical distance between the first substrate and the display substrate.

20. The display device of claim 10, wherein the display device further comprises:
a first circular polarizer arranged on a side of the first substrate away from the display substrate; and
a second circular polarizer arranged on a side of the display substrate away from the first substrate.

* * * * *